United States Patent [19]
Gatarz et al.

[11] Patent Number: 5,208,043
[45] Date of Patent: May 4, 1993

[54] ADJUSTABLE SHIMS FOR MOLD SEALS

[75] Inventors: Gregory M. Gatarz, East Brunswick, N.J.; Ronald M. Marsilio, Mogadore, Ohio

[73] Assignee: American Standard Inc., New York, N.Y.

[21] Appl. No.: 467,184

[22] Filed: Jan. 19, 1990

[51] Int. Cl.$^5$ .................. B29C 33/12; B29C 39/18; B29C 45/14
[52] U.S. Cl. .................................. 425/4 R; 277/34; 425/111; 425/116; 425/117; 425/125; 425/127; 425/817 R
[58] Field of Search ............... 249/83, 85, 88, 91, 249/93; 425/110, 116, 125, 117, 127, 4 R, 817 R, 111; 277/34, 34.3, 34.6, 27, 147, 149

[56] References Cited
U.S. PATENT DOCUMENTS

| | | | |
|---|---|---|---|
| 2,480,055 | 8/1949 | Seaton | 277/126 |
| 2,760,749 | 8/1956 | Ratigan | 277/126 |
| 2,841,823 | 7/1958 | Van Hartesveldt | 425/399 |
| 3,486,772 | 12/1969 | Elsner | 277/34 |
| 4,362,304 | 12/1982 | Hünger | 277/27 |
| 4,394,022 | 7/1983 | Gilmore | 277/36 |
| 4,448,425 | 5/1984 | Von Bergen | 277/34 |
| 4,626,185 | 12/1986 | Monnet | 425/116 |
| 4,664,982 | 5/1987 | Genovese et al. | 428/447 |
| 4,732,553 | 3/1988 | Hofer | 425/116 |
| 4,776,261 | 10/1988 | Larson | 277/34 |
| 4,844,944 | 7/1989 | Graefe et al. | 428/35.7 |
| 4,844,955 | 7/1989 | Graefe et al. | 418/1 |
| 4,915,395 | 4/1990 | Barteck | 425/116 |

Primary Examiner—Willard Hoag
Attorney, Agent, or Firm—Elaine B. Robinson; Ann M. Knab

[57] ABSTRACT

An adjustable sealing system for use in a molding apparatus is disclosed. The molding apparatus is used for applying a coating of polymeric material to the surface of a shell. The molding apparatus includes a molding surface and a seal groove adapted for retaining a seal. The molding apparatus is capable of receiving a shell and forming a molding cavity between a surface of a shell and the molding surface. The seal establishes sealed contact between the shell and the molding surface when the molding apparatus is closed. The adjustable sealing system includes a seal for insertion and retention in a seal groove of the molding apparatus, so that a portion of the seal extends from the seal groove to a selected height when the molding apparatus is open. A seal height adjustment means is disposed under the seal in the seal groove. The seal height adjustment means is capable of adjusting the height of the seal above the seal groove to correspond to a particular contour of a shell being molded. The shell establishes contact with the seal forming a sealed molding cavity between the shell and the receptacle's molding surface. The seal's height adjustment means may include a shaped polymeric wooden, metallic, or plastic shims; threadably adjustable shims; selectively sized ball bearings for placement between the shims; or a tubular expandable shim which may be inflated.

15 Claims, 15 Drawing Sheets

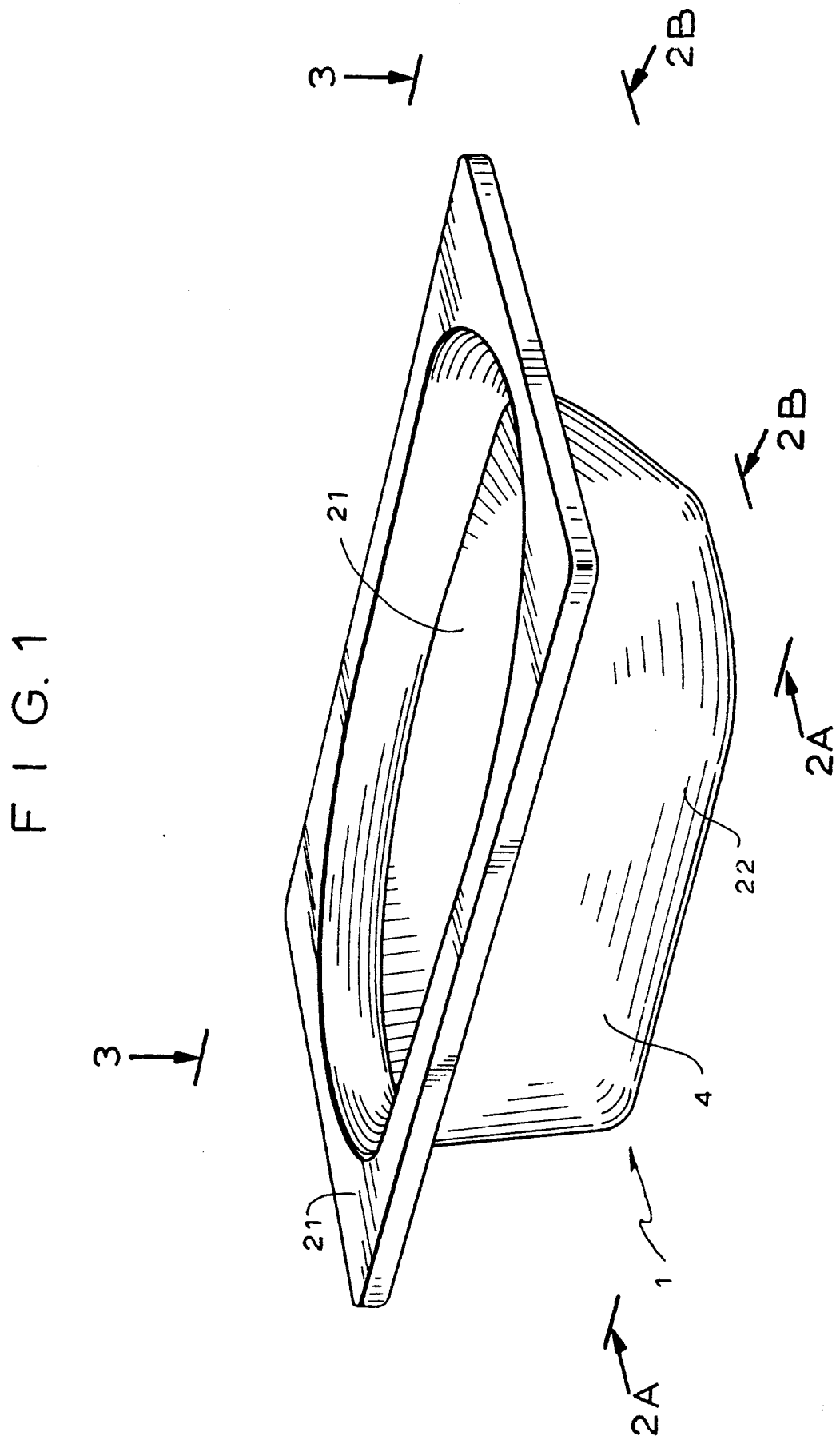

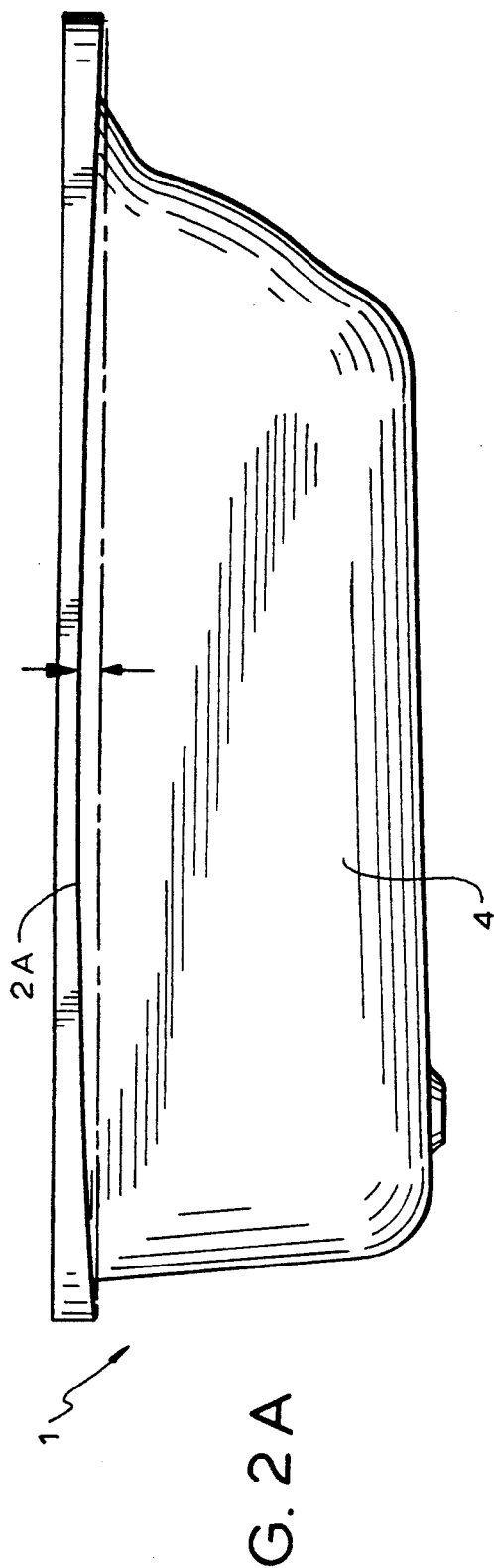
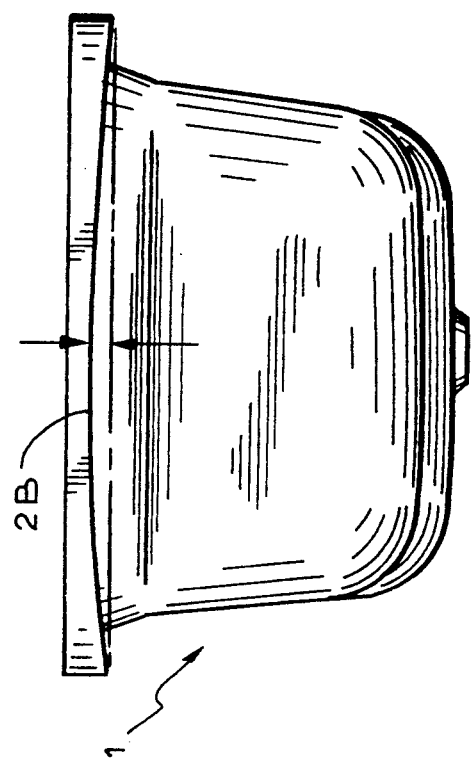
FIG. 2A
FIG. 2B

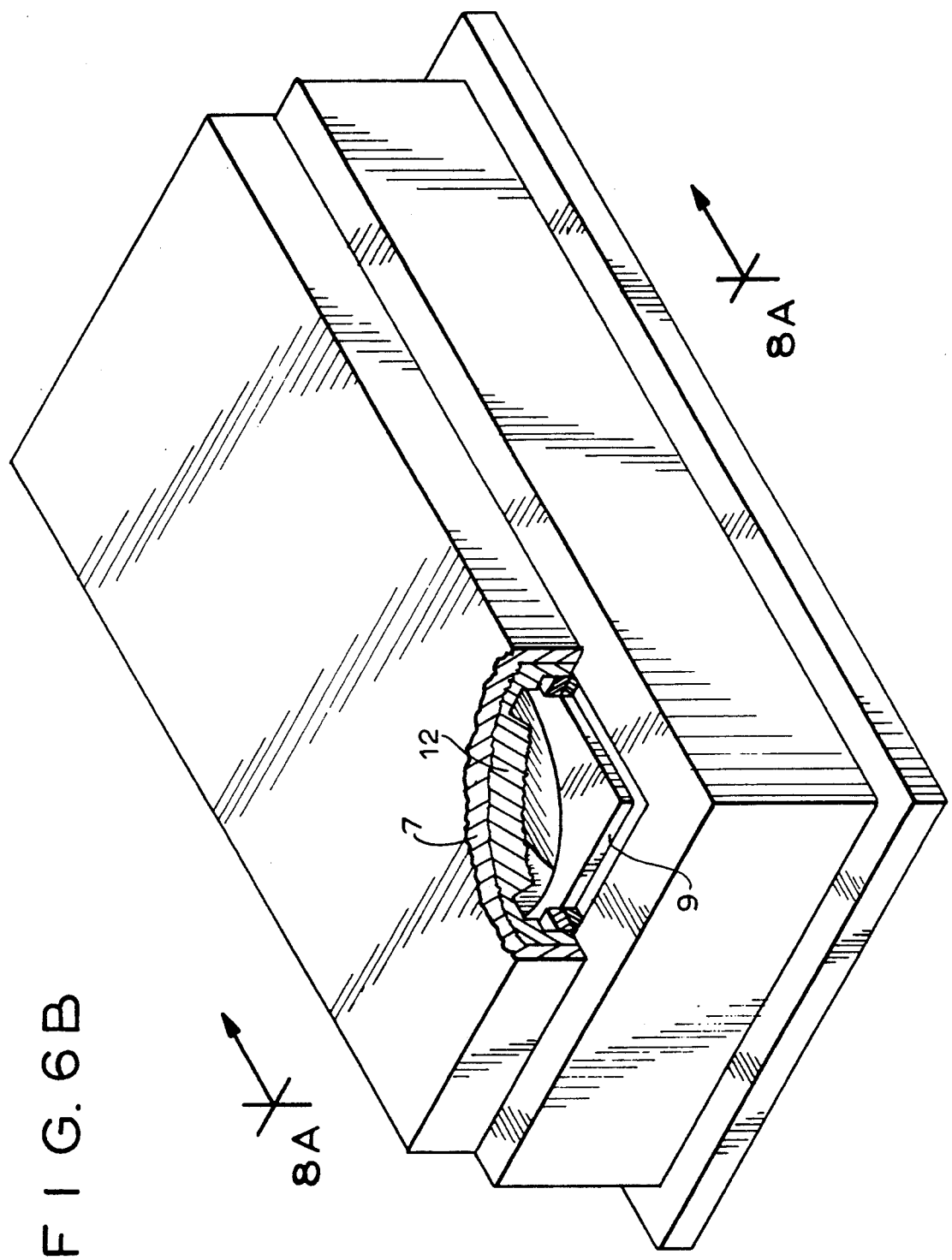

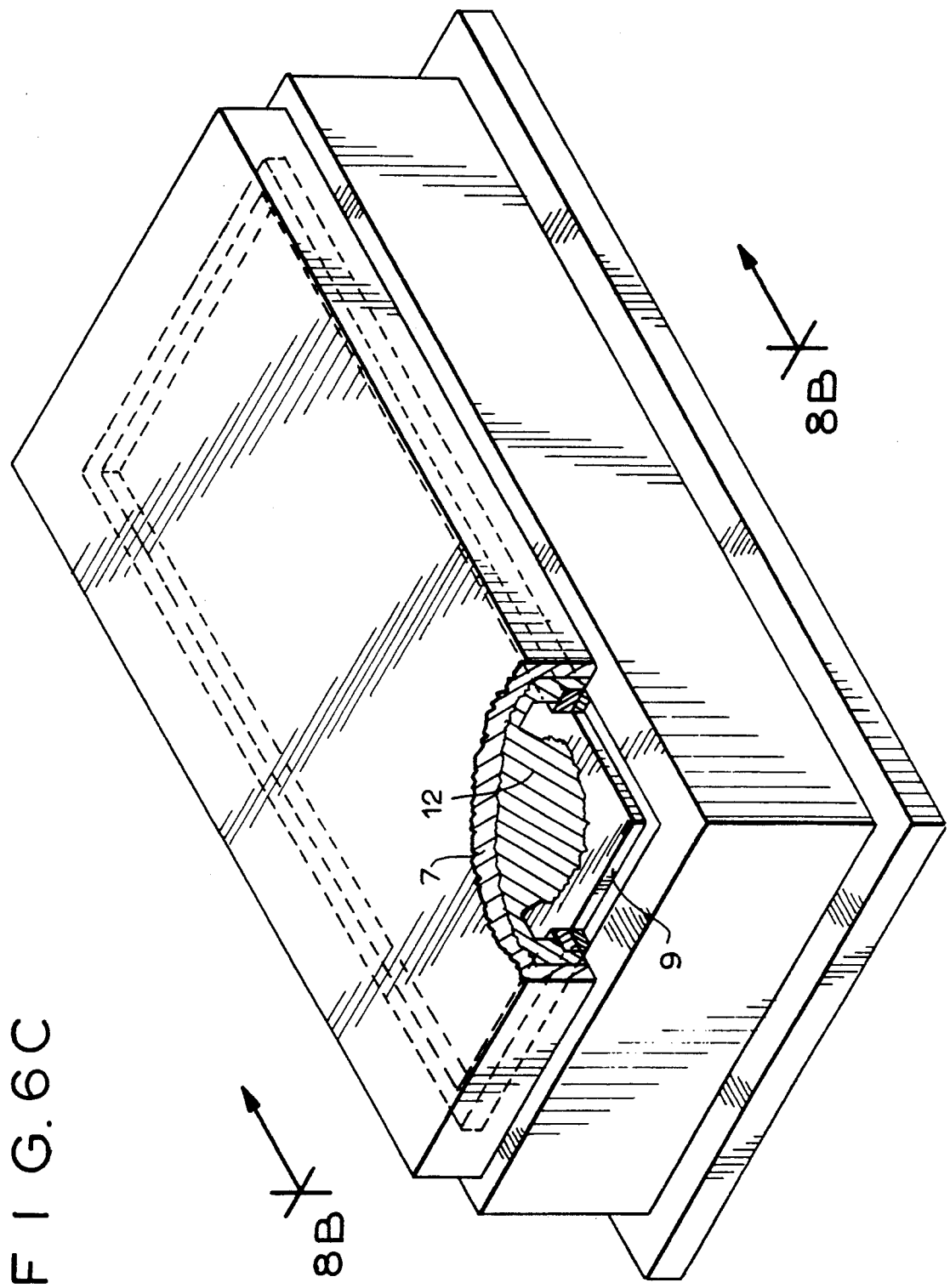

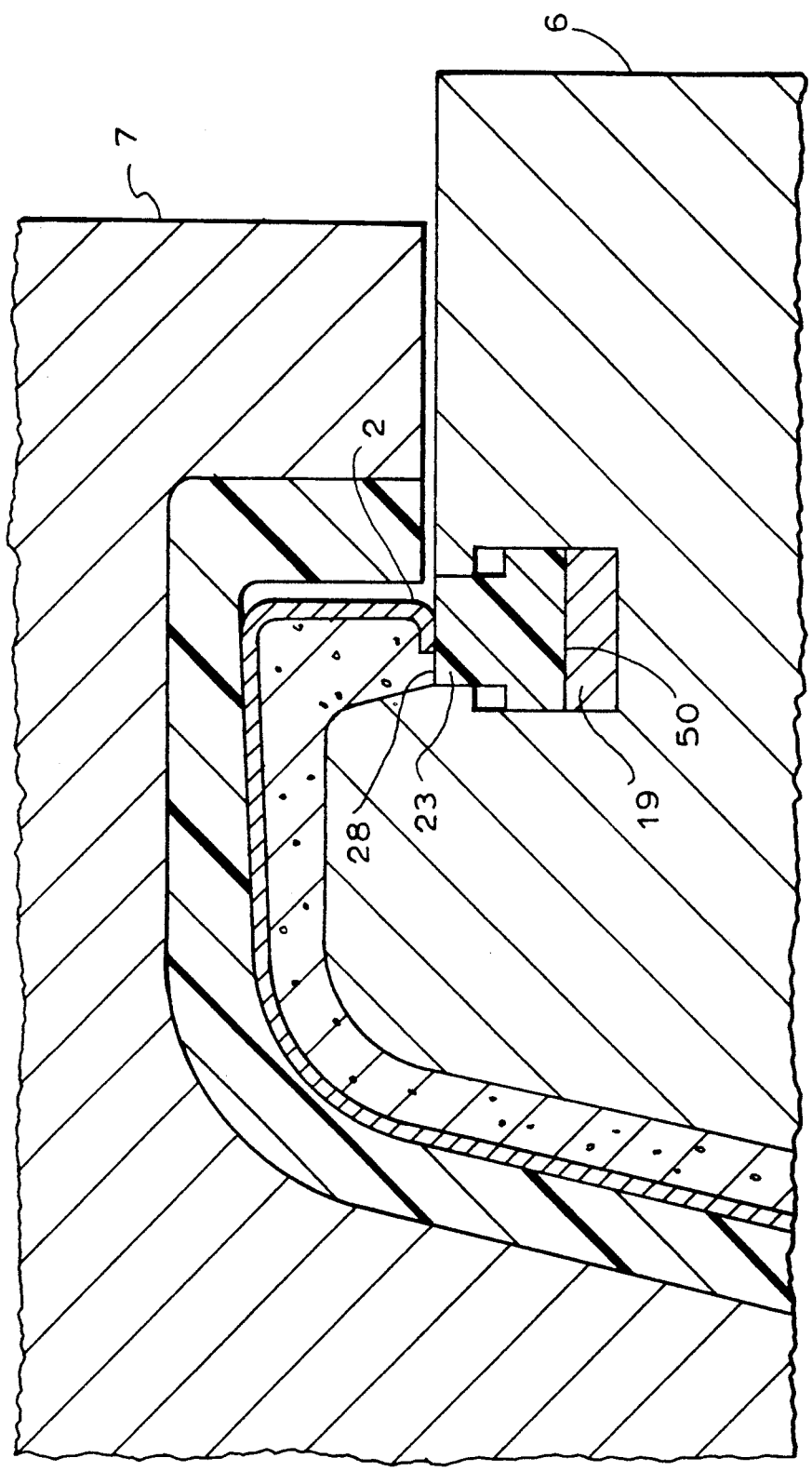

ADJUSTABLE SHIMS FOR MOLD SEALS

BACKGROUND OF THE INVENTION

1. Field of the Invention

The present invention relates generally to adjustable shims used with mold seals for injection molding of polymeric material to a shell.

2. Background of Related Art

For years, porcelain-cast iron mixtures have been widely used. However, one of the difficulties with porcelain-cast iron and enamelled fixtures has been their susceptibility to impact damage and their extreme weight which makes moving installation of large fixtures such as bathtubs and whirlpools, most difficult. While the porcelain-cast iron fixtures have the advantage of providing a very solid feel and high weight bearing capability, these drawbacks have made them less attractive.

Initial attempts by the industry to replace these porcelain-cast iron fixtures, have been to introduce lighter and more resilient component structures, however, this has not been without difficulty. Some of these included thin stainless steel fixtures which were lighter than the porcelain-cast iron fixtures, but did not have the solid feel or structural strength required for large articles such as bathtubs and whirlpool tubs. The early composite structures used in construction of such sanitary fixtures, had a plastic, hollow feel which would deform, crack, chip or delaminate when subjected to impact, thermal shock or the weight of a typical bather.

One successful solution to the above-mentioned shortcomings and drawbacks of prior art sanitary fixtures, is disclosed in U.S. Pat. No. 4,664,982 to Genovese et al., the disclosure of which is incorporated herein by reference as if fully set forth herein. U.S. Pat. No. 4,664,982 discloses a composite enamel steel fixture which has both the look and feel of the earlier porcelain-cast iron fixtures. The composite structure is light, has high structural strength, and resists delamination, chipping and denting due to impact or thermal shock. The composite enamel steel fixture is formed from a steel shell, which is typically formed from a blank by a series of stamping and punching operations. This shell is then enamelled often on both its finish surface and non-finish surface. As used hereinafter, the term "finish side" refers to the surface of the sanitary fixture with which a bather typically comes in contact during general use. The "non-finish side" refers to the underside surfaces of the sanitary fixture with which a bather typically does not come into contact. The enamelling process usually includes heating the steel shell to high temperatures and melting the enamel onto the shell surface. This heating and subsequent cooling often results in slight bowing and distortion of the shell. The enamelled shell is used as a part of a mold to form a layer of polymeric material by Reaction Injection Molding ("RIM") or by Reinforced Reaction Injection Molding ("RRIM") on the nonfinish side of the shell. An example of such a bathtub shell is illustrated in FIGS. 1, 2A, 2B, and 3 in particular. In FIGS. 2A and 2B, the inherent distortion contour formed along bottom edges 2A and 2B of the upper flange of shell 1 during manufacturing, is grossly exaggerated for purposes of illustration. The degree of distortion along the distortion contour is typically maximized along the mid portion of the sides of the shell. Distortion along the upper flange can be as great as 0.094 inches and is typically less at points farther away from the mid portion of the sides of the shell. The actual degree of distortion and warpage along the upper flanges of any particular sanitary fixture typically varies from one shell to another. In FIG. 3, the inherent distortion contour formed along the sides 3A and 3B of the upper flange of the shell 1 during manufacturing is also grossly exaggerated for purposes of illustration. The degree of distortion along this contour is also typically at a maximum along the mid portion of the sides of the shell. The actual dimensions of the distortion contour vary from shell to shell, but generally fall within a predictable range.

Commonly assigned U.S. Pat. No. 4,664,982 to Genovese, et al. and patent application Ser. No. 07/400,289 to Kuszaj, et al. now abandoned and refiled as Ser. No. 07/626,238 on Dec. 12, 1990 and now U.S. Pat. No. 5,049,443 both of which are incorporated by reference herein describe polymeric foam backed enamelled-carbon steel or stainless steel plumbing fixtures that are resistant to chipping, cracking, crazing, delamination or deformation when subjected to impact from either the finish or non-finish side. The use of the aforementioned composite mold structures results in fixtures which have the feel of porcelain-cast iron and enamel fixtures, high impact strength, and resistance to delamination. These composite structures possess excellent physical and mechanical properties as a result of the chemical bonding of the reinforced polymeric layer to the enamelled steel or stainless steel shell. Another approach was to replace the enamelled-steel shell with a polymeric-cosmetic surface layer and binding that layer directly to a foamed plastic substrate to provide a high impact strength, delamination-resistant structure. This approach is disclosed in commonly assigned U.S. Pat. Nos. 4,844,944 and 4,844,955 both to Graefe, et al., the disclosures of which are incorporated by reference herein. These approaches suffer from the same problems described above with regard to bowing, and warpage of the shell due to the irregularity in the shell from the manufacturing process.

Copending U.S. patent application Ser. No. 458,598, now U.S. Pat. No. 5,129,804 entitled "Mold Having An Insert For Molding Bathtubs And Method Of Molding Same" by Marsilio et al. filed on Dec. 29, 1989 and now U.S. Pat. No. 5,129,804, discloses an apparatus for molding polymeric material to the non-finish side of the shell. As disclosed by Marsilio et al., the steel shell is inserted within a female mold portion or receptacle having a molding surface, to form a cavity between the molding surface and the shell. In order to apply sufficient pressure to the shell during the molding operation, a male mold portion having a surface which substantially conforms to the finished surface contour of the shell, is urged against the finish side of the shell under high pressures using a mold press. In order to close off the cavity formed between the female mold portion and the shell, a sealing system is typically required for containing the polymeric material injected within the cavity under high molding pressures.

In a proposed sealing system employable in the above-described molding apparatus, a urethane coating is molded onto the male mold portion to protect the finish side of the shell. This protective urethane coating is formed on the undersized surface of the male mold portion. Urethane, for example, is injected between the cavity formed by the undersized surface of the male mold portion and the finish side of the shell. The urethane polymerizes and cures, forming a protective surface which coats on the male mold portion. This protective surface contacts the upper flange of the shell and a portion of the female mold, sealing off the molding cavity formed between the non-finish side of the shell and the female molding surface. This proposed sealing system suffers from several significant shortcomings. In particular, since the seal is cast as part of the protective urethane surface coating the male mold portion, it is not replaceable. Since such seals typically wear and deteriorate over repeated molding cycles and need to be replaced over time, such sealing systems are not desirable. Also, due to variations in the shape of the shell, particularly near the upper flange portions which contact the seal, due to the manufacturing operations described above, the shape of the molded seals may need to be varied. Accordingly, it is extremely difficult and often impossible to form an adequately sealed molding cavity into which the polymeric material can be introduced under adequate molding pressure. Consequently, the polymeric material flows across and beyond the seal, often damaging the finish surface of the shell, or adhering to the surface of the female mold.

Another proposed sealing system used in molding bathtubs is disclosed in U.S. Pat. No. 2,841,823 to Van Hartesveldt. It discloses a molding apparatus for low pressure compression molding of laminates useful in fabricating large bulky objects such as boats or bathtubs. The mold includes an L-shaped baffle anchored in an upper molding block, and a lower molding block having a U-shaped channel which faces the L-shaped baffle. An inflatable hose is located in the U-shaped channel. To form a seal, compressed air is introduced into the hose, causing it to expand and engage the L-shaped baffle. The mold sealing system, however, suffers from a number of significant drawbacks. In particular, the inflatable hose is only maintained in the U-shaped channel when pressed against the L-shaped baffle. Also, the inflatable hose may become dislodged from the U-shaped channel when the L-shaped baffle is lifted from the lower molding block.

U.S. Pat. Nos. 4,732,553 and 4,626,185 disclose an apparatus for molding gaskets around the periphery of a window. They often include fluid filled bladders which are located in both the upper and lower portions of the molding apparatus. Seals rest above the bladders within seal grooves. The inflatable bladders within the seal groove adjust the height of the seal to engage the glass surface which is being molded. These seals and bladders are designed to contact a perfectly uniform glass surface on both of its sides, and are not designed for compensating for variating in the shape of a shell by the use of a seal engaging only one surface of the shell being molded. Additionally, these seals are maintained in the groove by adhesives and therefore are not easily released from the seal groove.

Generally of interest is U.S. Pat. No. 4,394,022 to Gilmore which disclose an annular reusable sealing assembly for providing high pressure seals between containment surfaces, such as pipe sections or access port valves of a nuclear reactor. The seal assembly includes a U-shaped ring structure which has a containment surface and a seal which is positioning below the pipe section or access port valve to be sealed. A planar ring is positioned on the bottom of the inside of the U-shaped ring and a plurality of ring seal wedges with inclined surfaces cooperate with a plurality of bottom ring wedges that are positioned on top of the planar ring. Threaded posts connect the bottom ring wedges to the ring, so that when the bottom ring is rotated the bottom ring wedges slide against the ring seal wedges, causing the seal to be either raised or lowered, depending on the direction which the bottom ring is rotated. The mechanical system of Gilmore can only raise or lower the entire seal, it cannot lift one segment of the seal while lowering another segment to adjust the seal to a particular contour, as required in molding shells for making sanitary fixtures, such as bathtubs and whirlpool tubs.

In response to the problems associated with the prior art sealing systems, an alternative sealing system was proposed by the inventors, herein. In this proposed sealing system, a seal groove is formed in the male mold portion above the upper flange of the shell and adjacent the cavity formed between the underside surface of the shell and female mold, when the molding apparatus is in its closed position. In the seal groove, segments of urethane material are inserted end-to-end to form a seal which is retained in the male mold portion by an overhanging edge projecting from the protective urethane surface on the male mold portion. While this proposed sealing system provides a seal that can be replaced, however not without some difficulty, it nevertheless suffers from several significant shortcomings and drawbacks. In particular, the overhanging edge projecting from the protective urethane surface fails to adequately retain the seal in the groove of the male mold portion during demolding operations. Also, this system is incapable of establishing an effective seal along all engaging surfaces of the shell, due in large part to the bowing and distortion in the shells from the manufacturing processes.

In view of the shortcomings and drawbacks of proposed prior art methods and apparatus for effecting a seal between the shell and molding surface of a mold receptor used for molding polymeric material to the surface of the shell, there is a clear need to provide a type of sealing system that overcomes the above-described shortcomings and drawbacks.

Accordingly, it is an object of the present invention to provide a sealing system for molding polymeric material to the surface of a shell, in which the height of the seal in can be selectively adjusted along the length of the groove in the mold in order to form a perfect seal along all engaging surfaces of the shell and mold.

It is another object of the present invention to provide such a sealing system in which the height of the seal along the length of a seal groove in the mold, can be variably adjusted to accommodate the distortion contour along the upper flanges of sanitary fixture shells caused as a result of operations employed in the manufacture of the shell.

SUMMARY OF THE INVENTION

These and other objects are achieved by the present invention which provides an adjustable sealing system for use in a molding apparatus. The molding apparatus is used for applying a coating of polymeric material to the surface of a shell. The molding apparatus includes a molding surface and a seal groove adapted for retaining a seal. The molding apparatus is capable of receiving a shell and forming a molding cavity between a surface of a shell and the molding surface. The seal establishes sealed contact between the shell and the molding surface when the molding apparatus is closed. The adjustable sealing system includes a seal for insertion and retention in a seal groove of the molding apparatus, so that a portion of the seal extends from the seal groove to a selected height when the molding apparatus is open. A seal height adjustment means is disposed under the seal in the seal groove. The seal height adjustment means is capable of adjusting the height of the seal above the seal groove to correspond to a particular contour of a shell being molded. The shell establishes contact with the seal forming a sealed molding cavity between the shell and the receptable's molding surface. The seal's height adjustment means may include a shaped polymeric, wooden, metallic, or plastic shims; threadably adjustable shims; selectively sized ball bearings for placement between the shims; or a tubular expandable shim which may be inflated with a fluid under pressure for supporting the seal.

For a better understanding of the present invention, reference is made to the following description, taken in conjunction with the following figures, the scope of which is pointed out in the appended claims.

BRIEF DESCRIPTION OF THE DRAWINGS

FIG. 1 is a perspective view of a bathtub shell to which a polymeric material is applied to its non-finish side during molding operations.

FIG. 2A is a side elevational view of the shell taken along line 2A—2A of FIG. 1, illustrating inherent variations (i.e. presence of a distortion contour) in the vertical direction caused by manufacturing processes along the bottom edge of the upper flange of the shell.

FIG. 2B is a side elevational view of the shell taken along line 2B—2B of FIG. 1, illustrating inherent variations due to manufacturing processes in the vertical direction along the bottom edge of the upper flange of the shell.

FIG. 4A is a perspective view of molding apparatus used in molding processes, showing a female mold portion having a molding surface and a male molding portion having a protective surface coating, with a sanitary fixture shell interposed in between.

FIG. 6B is a perspective view of a female mold portion and a male mold portion, with a shell interposed in between. The molding apparatus approaching its closed position, and where a portion of the male mold portion, sealing system of the present invention, and shell are shown broken away.

FIG. 6C is a perspective view of a female mold portion and a male mold portion, with sanitary fixture shell embraced in between. The molding apparatus is in its closed position, and a portion of the male mold portion, sealing system of the present invention, and shell are shown broken away.

FIG. 8B is a cross-sectional view of the molding apparatus illustrated FIG. 6B taken along line 8B—8B, showing the shell embraced within the molding apparatus in its closed position, with the sealing system including the adjustable shims of the present invention in the female mold portion.

DETAILED DESCRIPTION OF THE PREFERRED EMBODIMENT

The adjustable shims of the present invention are applicable between a wide variety of apparatus used in applying a polymeric layer to surface of a shell, such as those used in forming sanitary fixtures including bathtubs, sinks, whirlpool tubs, spas, therapeutic tubs and the like. However, for purpose of illustration, the general concepts and principles of the present invention are described and shown in apparatus for the injection molding of polymeric material to a side of a bathtub shell.

Figure 3:
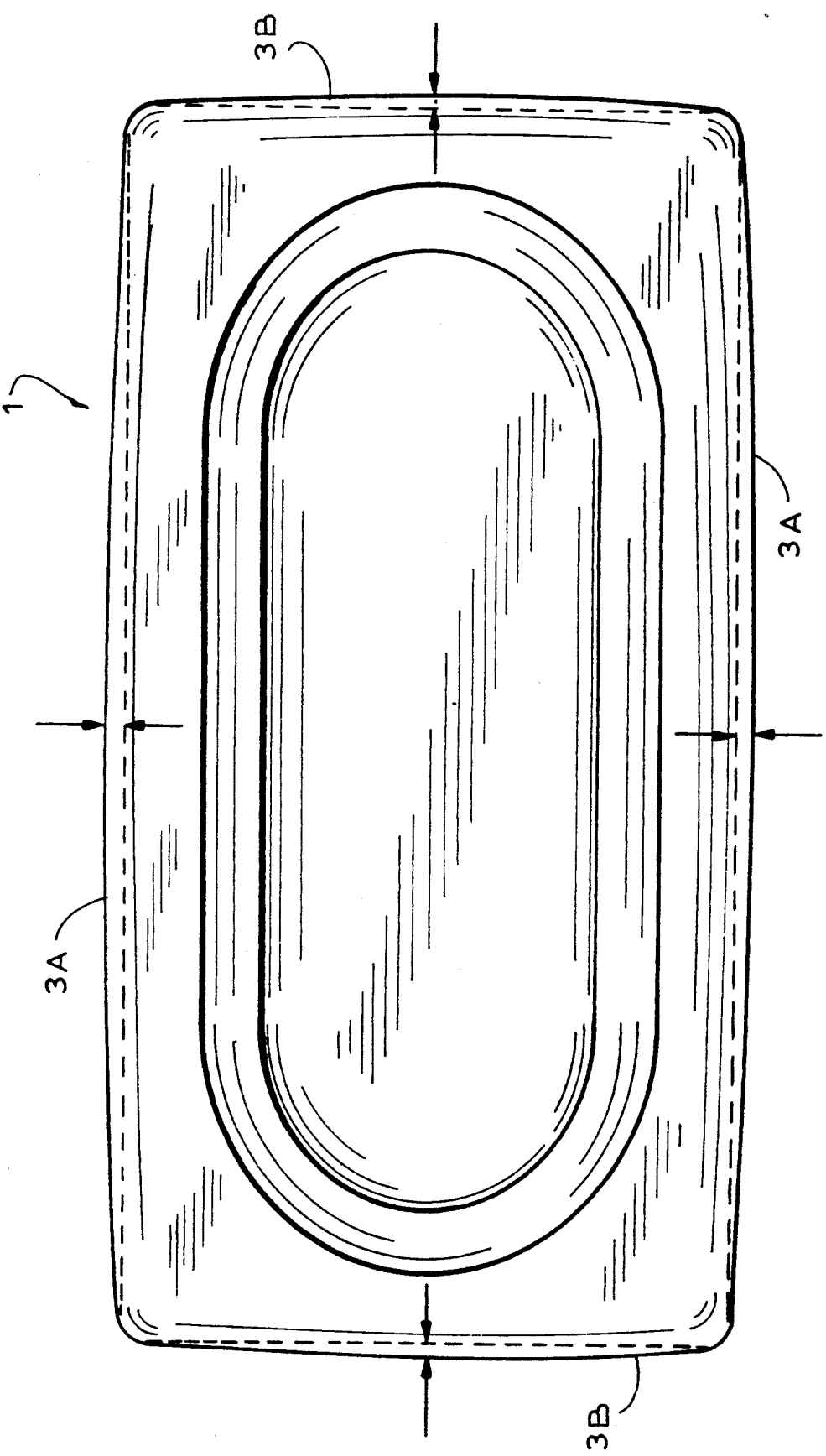
FIG. 3 is a top plan view of the shell taken along lines 3—3 of FIG. 1, showing inherent variations due to manufacturing processes in the horizontal direction along the sides of the upper flange of the shell.
Figure 4A:
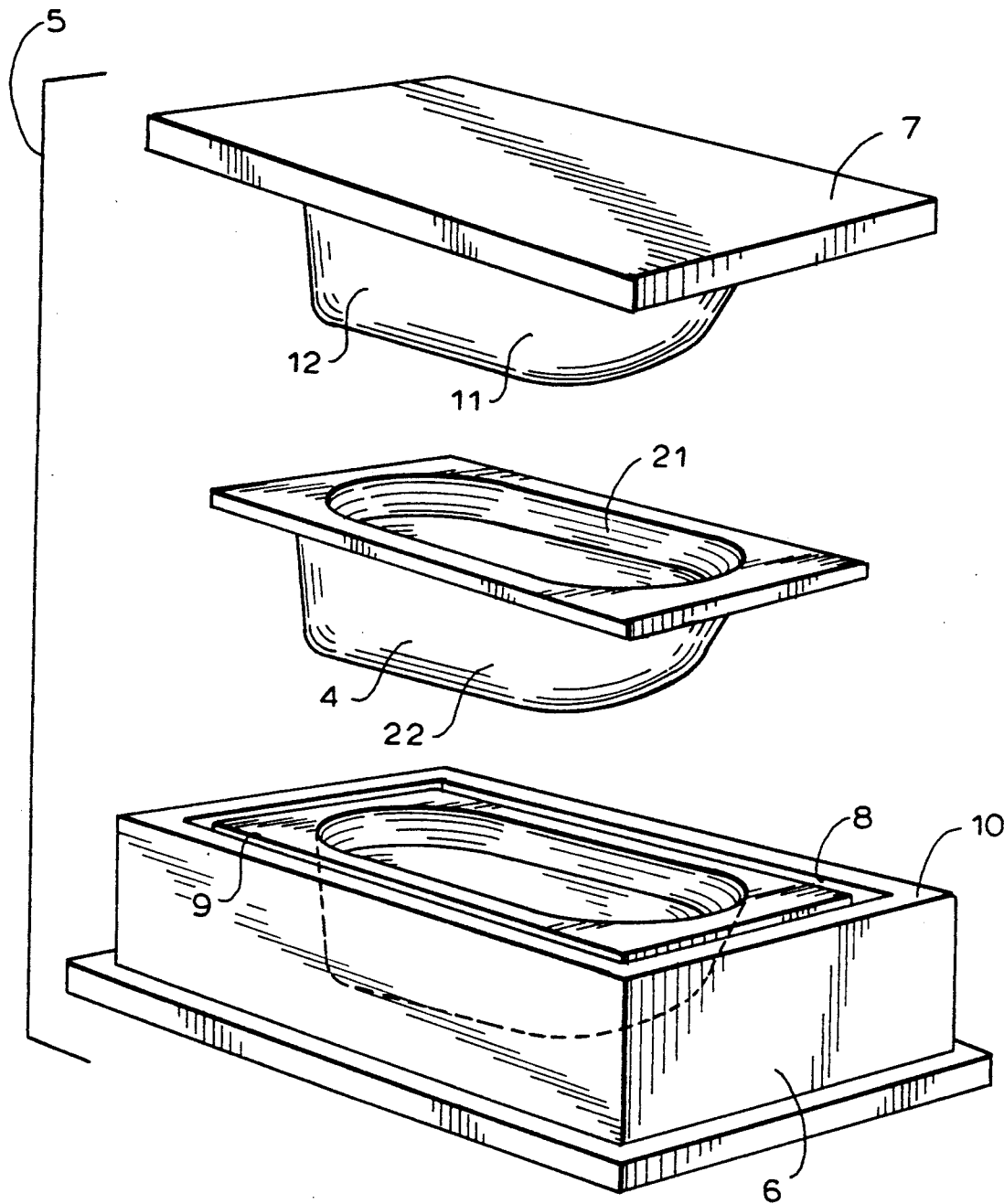

In FIG. 4A, a molding apparatus used in molding polymeric layer to the non-finish surface of a shell 1, as described for example in copending U.S. patent application No. 458,598 to Marsilio et al., filed on Dec. 29, 1989, now U.S. Pat No. 5,129,804 incorporated by reference herein. In general, the molding apparatus comprises a female mold portion 6 and a male mold portion 7. The female mold portion includes a molding surface 8 generally corresponding to the surface geometry of the underside surfaces of the shell 1 to which the polymeric coating is to be applied. About the substantially planar deck portion 9 of the female mold portion 6, there is formed a seal groove 9 in the planar deck portion 10 of the female mold portion 6.

As illustrated in FIG. 4A, the seal groove 9 extends about the perimeter of the molding surface 8 and extends continuously and encloses upon itself to form a groove in the shape of a substantially rectangular loop. While not shown, the female mold portion 6 is provided with at least one aperture formed in the molding surface 8, which communicates with a mix head 20 for introducing a hardenable polymeric material into the molding cavity created between the molding surface 8 and the exterior underside surface 4 of the shell 1. Also, a plurality of ejectors (not shown) positioned in the female mold portion 6, and serve to separate and eject a molded bathtub from the female mold portion 6 after the RIM or RRIM molding process has been completed. Preferably, the ejectors are cylindrical rods which are hydraulically activated from a recessed position, to an ejector position, and vice versa.

In general, the male mold portion 7, comprises a pressure applying surface 11 having a surface geometry generally corresponding to the finish surface 21 of the bathtub shell 1. This pressure applying surface 11 bears the protective coating 12 formed from urethane material supplied to the pressure applying surface 11, in a manner described in the description of the Related Prior Art. This urethane protective coating 12 provides a soft resilient surface which applies pressure to the shell during molding operations, without damaging the finish surface 21 of the shell.

Figure 4B:
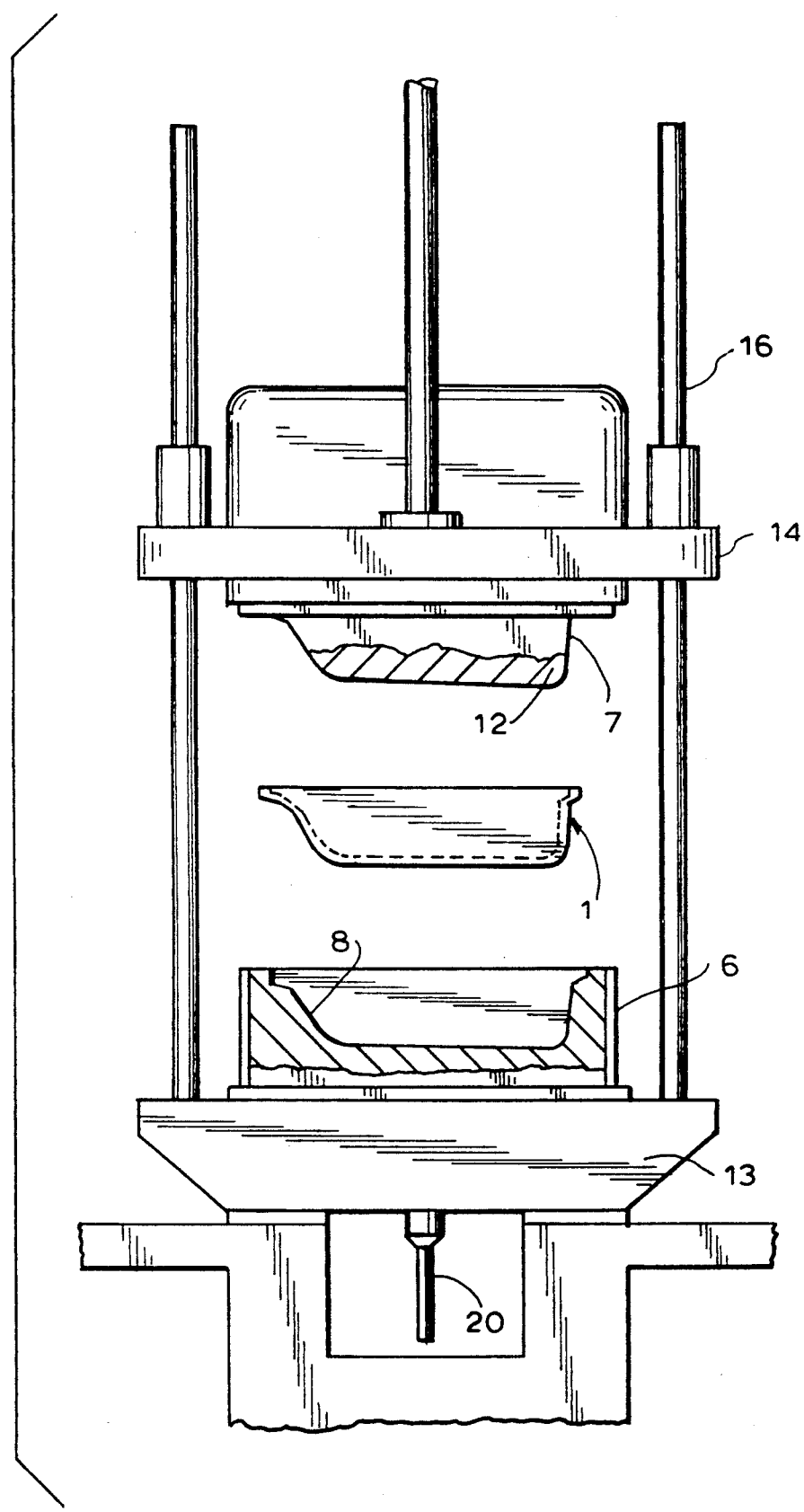
FIG. 4B is an elevated side view of a molding apparatus illustrated in FIG. 4A, shown with a mold press used for closing the male mold portion down onto the female molding portion, with the sanitary fixture interposed in between under high pressures.

Referring to FIG. 4B, there is shown the female mold portion 6, and the male mold portion 7 attached to a stationary platform 13 and a translatable platform 14, respectively, of a mold press 15. The mold press 15 also includes a hydraulically operated system 16 which lowers and retains the male mold portion 7 against the finish side 21 of the bathtub shell 1 and the non-finish side 22 of the shell 1 adjacent the molding surface 8 of the female molding portion 6 during the molding process. In such a lowered position, molding cavity 18 is formed between the underside surface of the shell and the molding surface of the female portion 6, as illustrated for example in FIG. 8B in particular. A mold press 16 which is suitable for molding bathtubs in accordance with the method and apparatus of the present invention, is manufactured by Linden Industries, Inc.

Figure 6A:
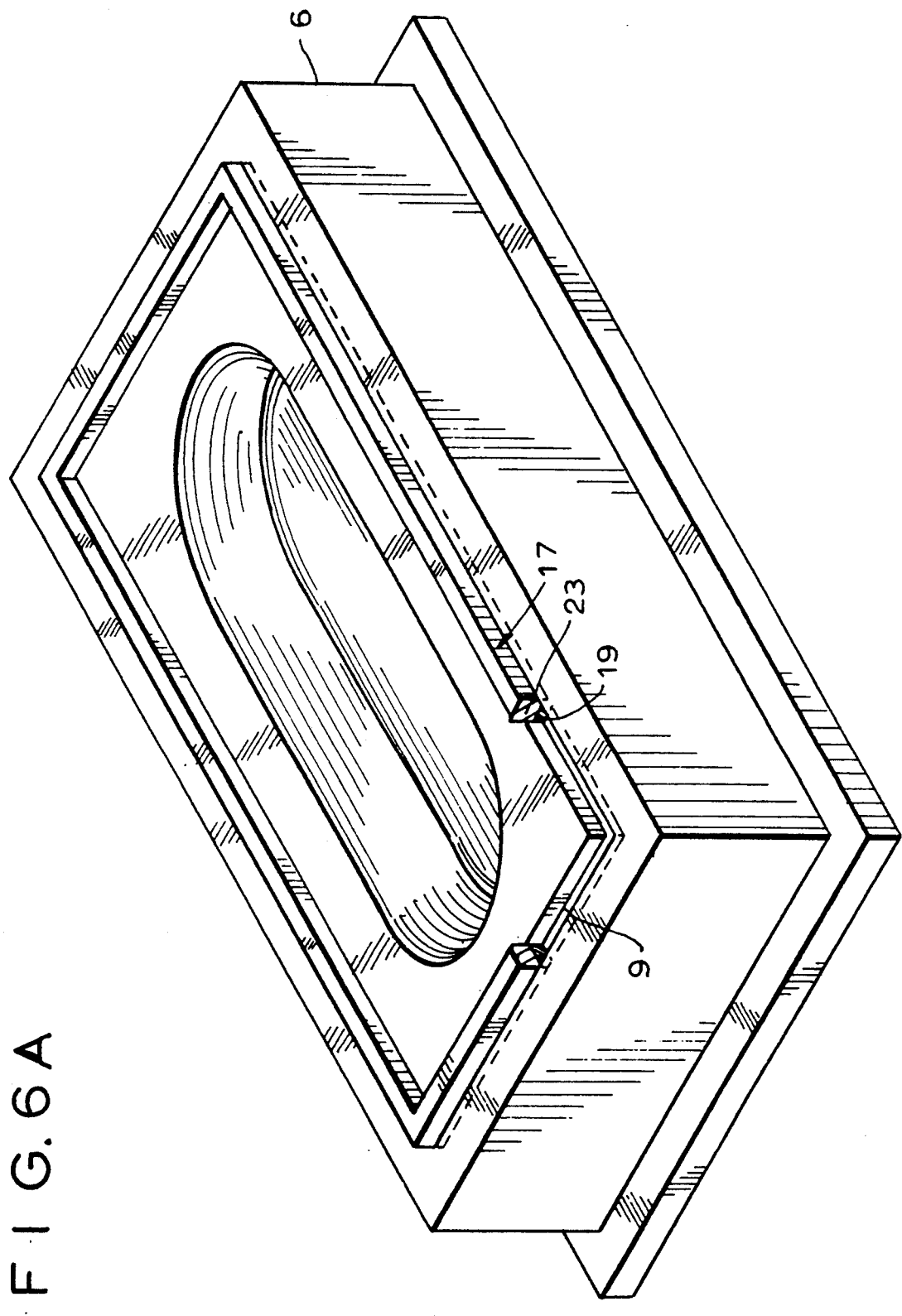
FIG. 6A is a perspective view of the female mold unit showing the installation of the sealing system of the present invention in the seal groove, with a portion of the seal broken away for purpose of illustration.
Figure 7:
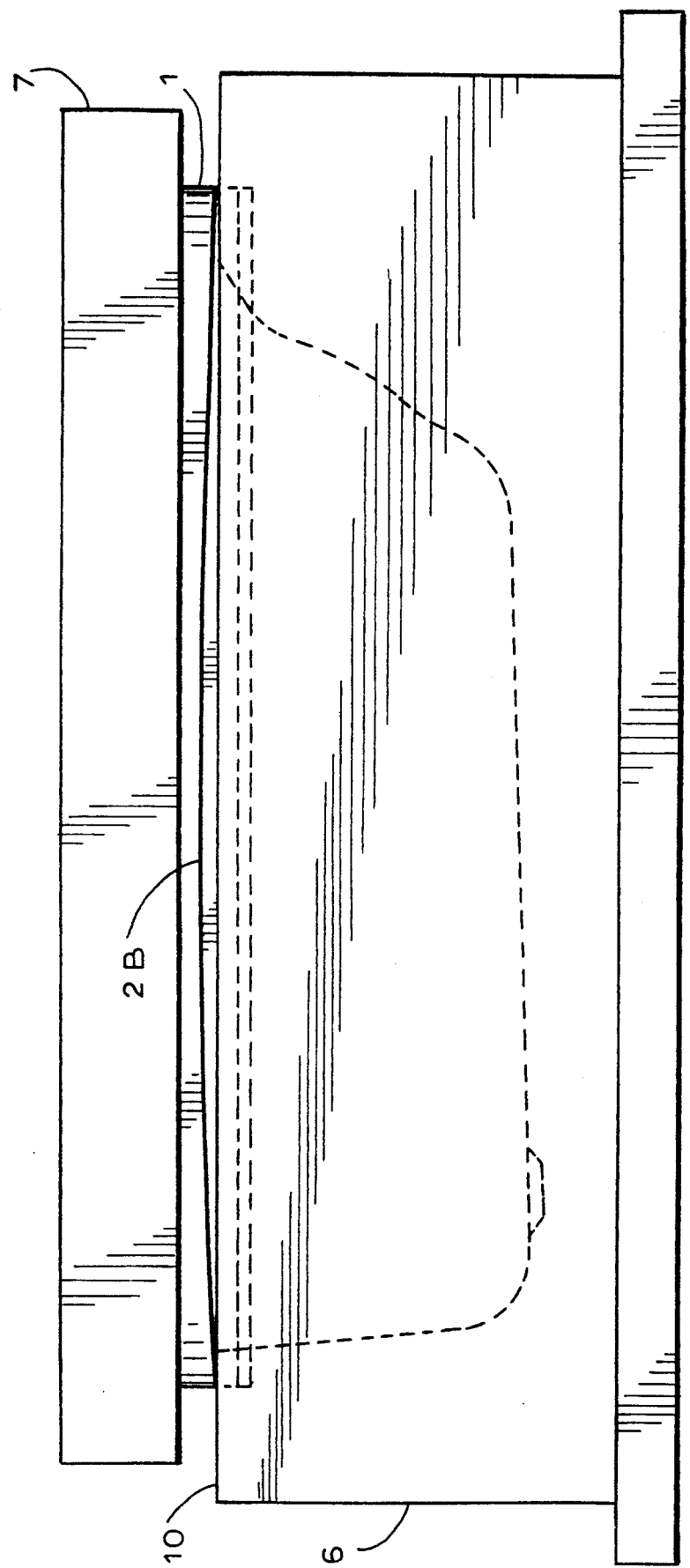
FIG. 7 is a cross-sectional elevational view of the molding apparatus and sealing system of the present invention shown in FIG. 6C, taken along line 7—7, illustrating height adjustment means for the sealing system of the present invention, and its capability of adapting to variations in shell geometry, in providing a perfect seal during molding operations.

Referring to FIG. 6A, the female mold portion 6 is shown with the sealing system 17 installed within seal groove 9. Preferably, a portion of the sealing system is broken away to illustrate that the sealing system 17 comprises, in general, a seal 23 and a seal high adjustment means 19 which is disposed at the bottom 20 of the seal groove underneath the seal 23. The seal right adjustment means provides a desired degree of adjustment to the height of the seal above the seal groove, in a manner which will be described in greater detail below.

Figure 8A:
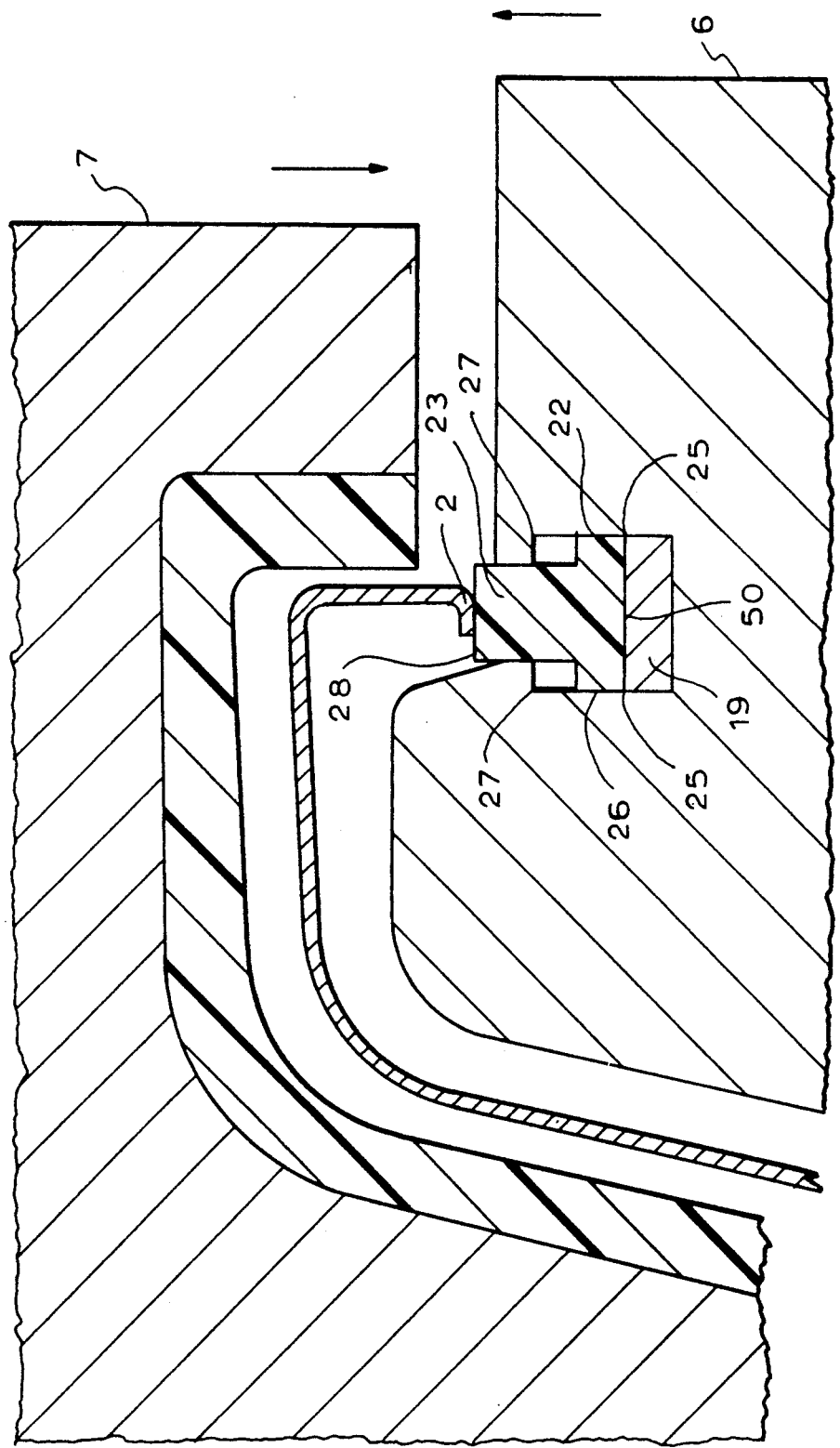
FIG. 8A is a cross-sectional view taken along line 8A—8A of FIG. 6B showing the shell embraced within the molding apparatus approaching its closed position, and where the adjustable shims of the present invention are installed within the female mold portion.

Referring to FIGS. 8A and 8B, a more detailed view illustrating of the sealing system 17 when installed within the seal groove 9, is provided. In a preferred embodiment of the present invention, the seal groove 9 comprises bottom wall 24 and opposing side walls 25 to forming a substantially rectangular shaped channel groove. The seal 23 has a substantially rectangular cross section, however it also has a pair of side flanges 22 which are retained within recessed wall grooves 27 formed in and along opposing side walls 25. Seals useful in the present invention are described in greater detail in copending patent application Ser. No. 07/467,771 filed Jan. 19, 1990 and abandoned and refiled as Ser. No. 931,436, entitled "ELASTOMERIC MOLD SEALS" by the inventors herein, filed concurrently herewith. The disclosure of that application is incorporated by reference herein. As illustrated in FIGS. 8A and 8B, flanges 26 of the seal are free to move in an upward and downward position within the side wall grooves 27, delimiting the maximum height adjustment of the seal within the groove 9. Wall grooves 27 also serve to retain the seal in the seal groove during demolding operations when the male mold portion 7 is pulled away from the female mold portion 6. This seal retention feature is important, since the upper flange edge 2 and cured polymeric material typically adhere to the top surface 28 of the seal 23 during demolding operations. The adherence of the seal to the shell and polymeric material would pull the seal out and away from the seal groove 9 if the seal retention feature were not present. Thus, without this seal retention feature removal of the seal from groove 9 would typically occur during demolding operations, requiring that the seal be manually reinserted into the groove, which is time consuming, laborious and costly from a manufacturing point of view.

Figure 5:
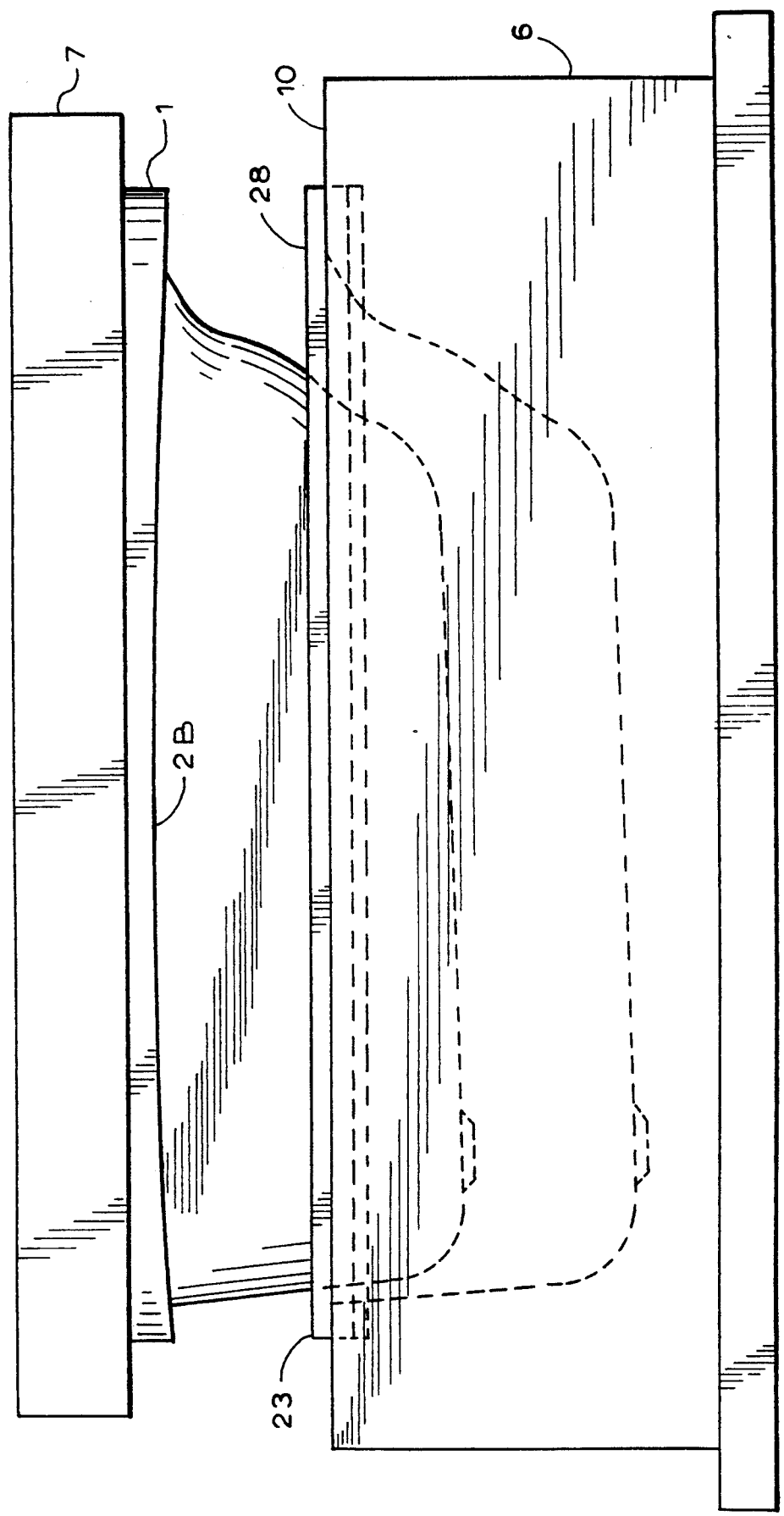
FIG. 5 is a side elevational view of the molding apparatus shown in FIG. 4A with the sealing system of the invention installed but not "adjusted" to accommodate the inherent distortion contour along the bottom edge of the upper flange of the shell.

Referring now to FIG. 5, there is shown a typical bathtub shell 1 which is positioned over the pressure transferring surface 11 of the male mold portion 7, which is not closed down upon the female mold portion 6. In this embodiment, if the seal height adjustment means 19 is not "adjusted" along the length of the seal groove, the seal would typically permit cross-seal leakage of polymeric material during high pressure molding operations. If pressure on the male mold portion 6 were increased to compensate for the leakage, the shell 1 may be damaged. As shown, the top surface 28 of the seal 23 is substantially parallel with the planar deck portion 10 of the female mold portion 6 and, without the seal height adjustment system properly adjusted, a substantial gap, from about 0 (or flat) to about 0.125 inches is typically formed between the upper flange bottom edge 2B and the top surface 28 of the seal 23 when the male mold portion 7 is closed down upon the female mold portion during molding operations. The occurrence of such a gap between the upper flange bottom edge 2B and the top surface 28 of the seal, proposes serious problems, (i.e. cross seal leakage during molding operations) but is eliminated by properly adjusting height contour of the seal according to the present invention.

Referring now to FIGS. 9A and 9B, 10A and 10B, and 11A and 11B, there are shown various embodiments of the height adjustment means 19 of the present invention, which can be used to adjust the height of the seal along the seal groove so that the top surface 28 of the seal will accommodate the distortion contour along the particular shell when the male mold portion 7 is closed down upon the female mold portion 6 during molding operations. As hereinafter used, solid is intended to refer to a portion of the seal member which is non-inflatable as shown in the embodiment of the invention illustrated in FIGS. 9A and 10A.

Figure 9A:
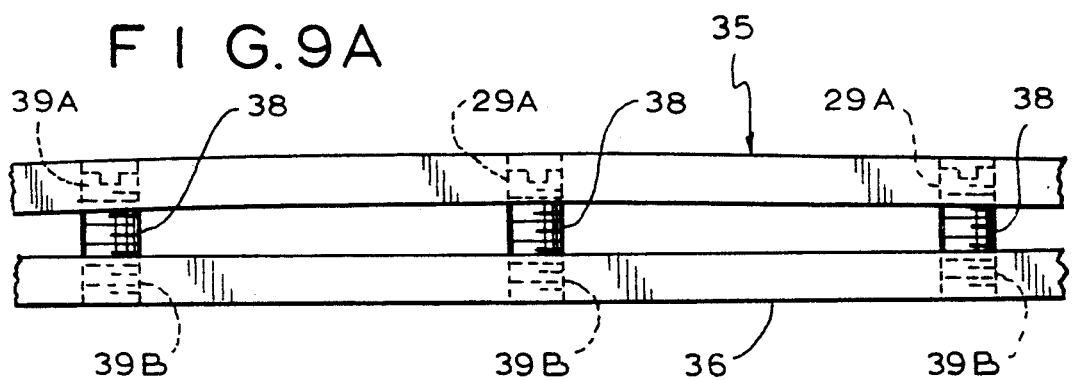
FIG. 9A is a side elevational view of a portion of one embodiment of the adjustable shims of the present invention which is threadably adjustable.
Figure 9B:
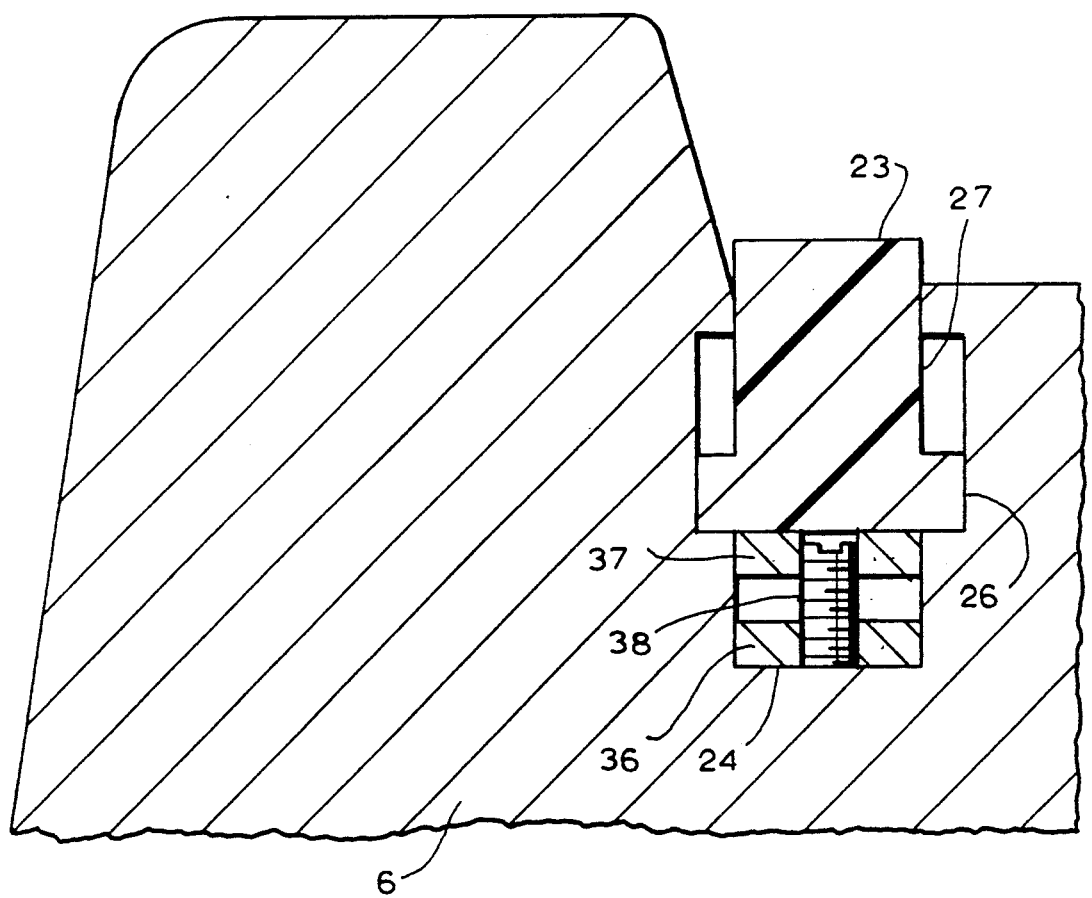
FIG. 9B is a cross-sectional side view of a portion of a female molding unit employing the threadably adjustable shims illustrated in FIG. 9A.

In FIGS. 9A, 9B, one particular embodiment of the seal height adjustment means 19 is illustrated. In this embodiment the seal height adjustment means 19 comprises one or more structural elements 35, each including a first planar member 36 disposed on the bottom surface 24 of the seal groove 9, and a second member 37 disposed above the first member 36 and adapted for supporting the seal 23. Each structural element 35 also includes a plurality of adjustable separation elements 38 which are vertically disposed along the length of the first and second planar members, and pass through at least a portion of the first and second members 36, 37.

These adjustable separation elements 38 are capable of providing variable spacing between and along respective portions of the first and second planar members 36, 37. In a preferred embodiment, each separation element 38 comprises a screw which passes through a pair of vertically aligned threaded holes 39A and 39B formed through the first and second planar members 36 and 37, respectively. The threaded holes receive selected portions of the screws so as to establish a preselected height adjustment contour between and along the first and second planar members 36, 37. As shown in FIG. 9B, the structural element 35 is disposed along the bottom 24 of the seal groove 9, and under the seal 23.

Figure 10A:
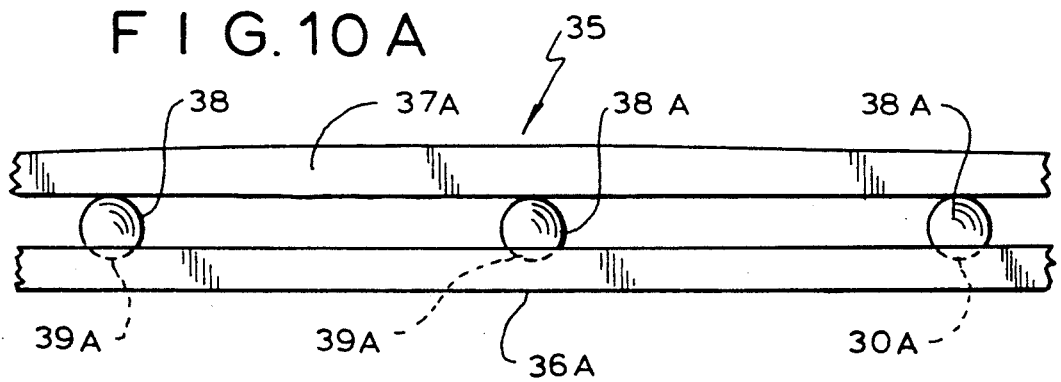
FIG. 10A is a side elevational view of a portion of another embodiment of the adjustable shims of the present invention which is adjusted using sized ball bearings.
Figure 10B:
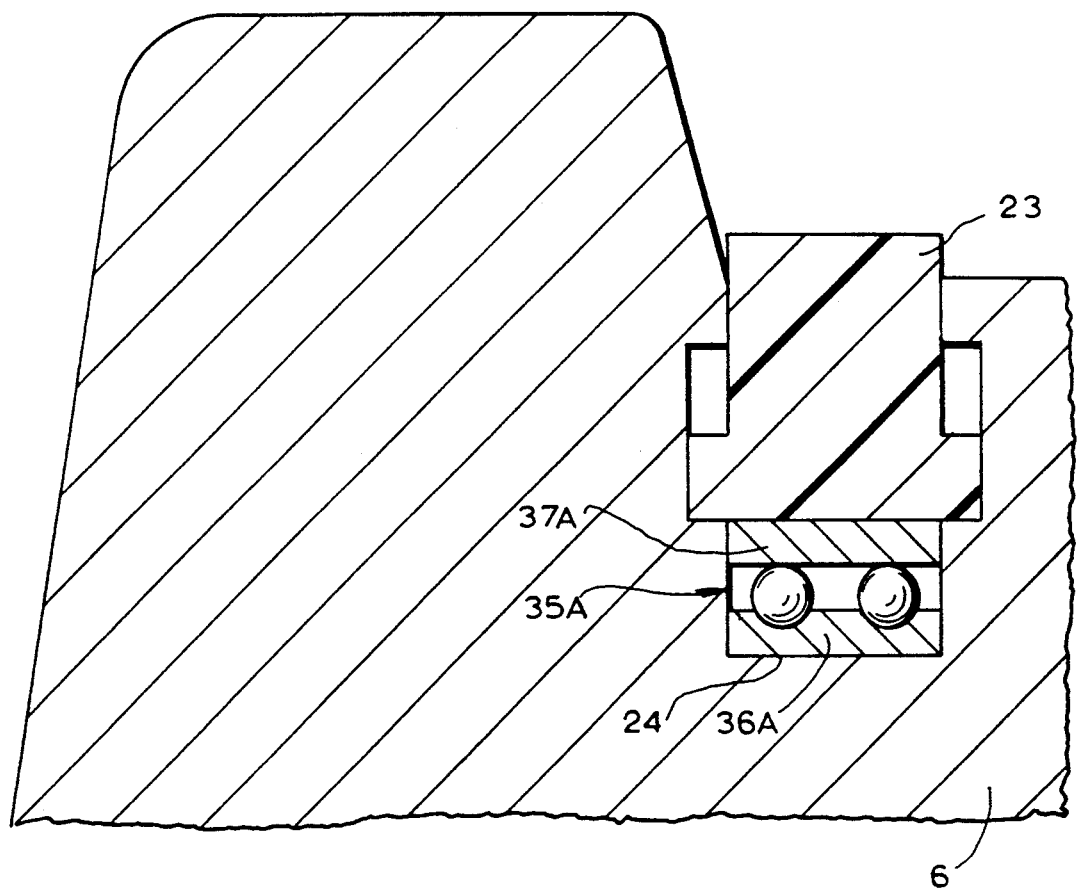
FIG. 10B is a cross-sectional side view of a portion of a female mold portion employing the ball bearing adjustable shims illustrated in FIG. 10A.

Referring now to FIGS. 10A and 10B, another preferred embodiment of the seal height adjustment means of the present invention is shown. In FIG. 10A the seal height adjustment means 19 is realized by a structural element 35A, comprising a first planar member 36A which is disposed on the bottom surface 24 of the seal groove 9, and a second planer member 37A which is disposed above the first planar member 36A, provides support for the seal 23. As shown, a plurality of separation elements 38A in the form of spherical ball bearings 38A are received in respective concave indentations 39A formed on the first planer member 36A, to provide a predetermined spacing between and along respective portions of the first and second members 36A and 37A, respectively. Each ball bearing 38A has a diameter selected to provide the desired spacing between the first and second members along the length of the structural element 35A and establishes a preselected height adjustment contour of the seal.

Figure 11A:
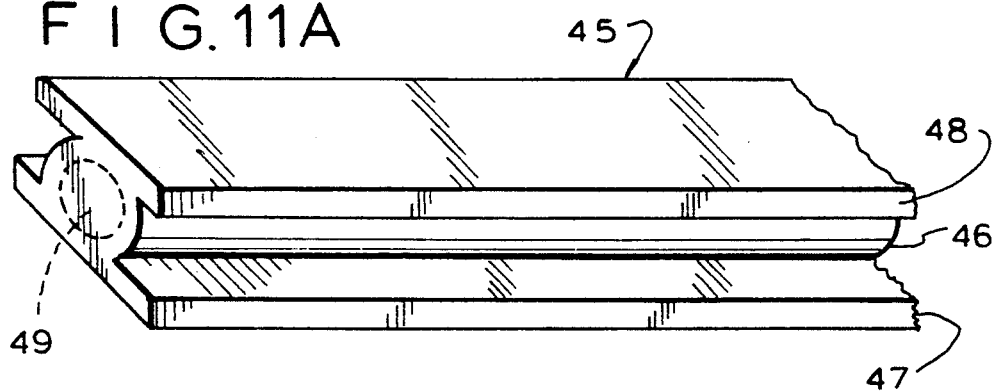
FIG. 11A is a side elevational view of a portion of yet another embodiment of the adjustable shims of the present invention which is fluid adjustable.
Figure 11B:
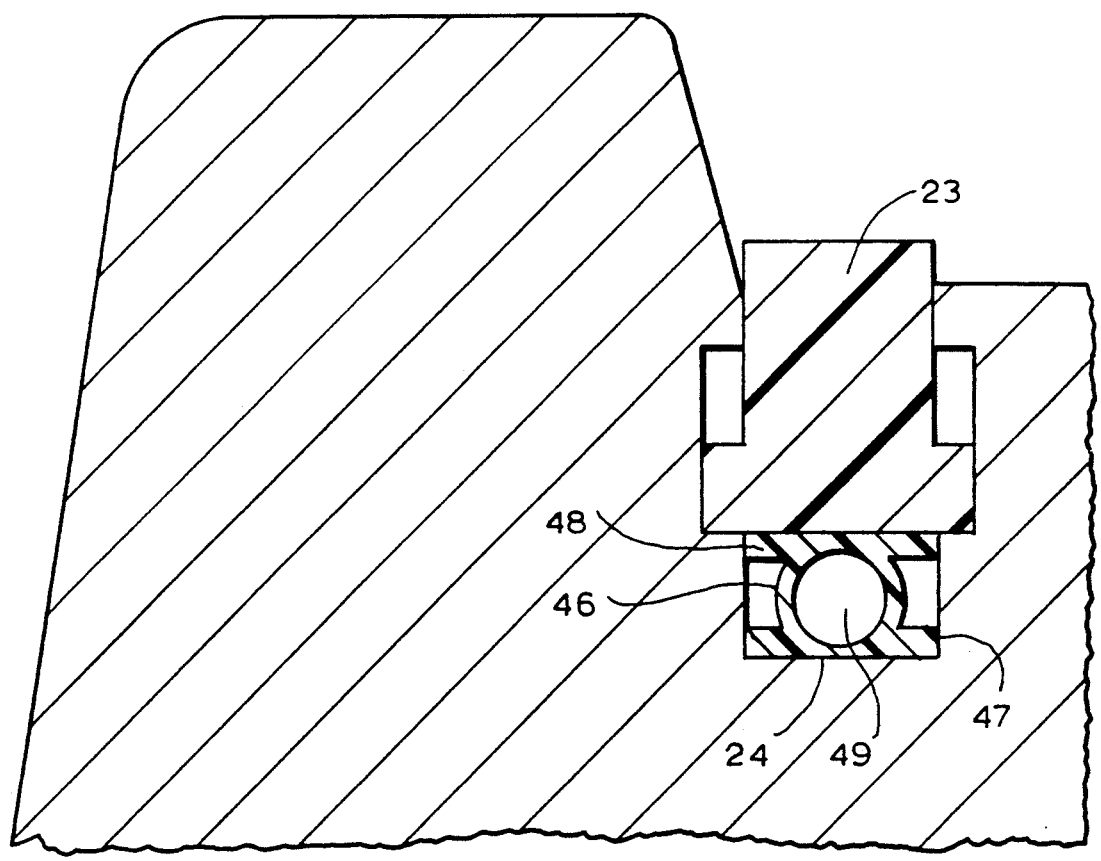
FIG. 11B is a cross-sectional view of a portion of a female mold portion employing the fluid adjustable shims illustrated in FIG. 11A.

Referring now to FIGS. 11A and 11B, yet another embodiment of the seal height adjustment means is illustrated. As shown in FIG. 11A, the seal height adjustment means in accordance with this embodiment, is realized by a structural element 45 comprising a tubular structure 46. In general, the tubular structure 46 has a length dimension sufficient to extend along the length of the seal groove 9. The tubular structure 46 has an expandable cross-sectional dimension which is capable of receiving a selected volume of air or other fluid to support, under pressure, the seal 23 at various heights above the seal groove 9, when the molding apparatus is closed during molding operations.

In general, the ends of the tubular structure 45 are sealed, and the side walls 47 are elastic in nature so as to expand when the tubular structure is filled with fluids, such as air under a desirable range of pressure. The cross-sectional geometry of the tubular structure 45 may vary from embodiment to embodiment, and preferably is provided with a planer base 47 which is adapted to lie flat within the bottom 20 of the seal groove 9. Also, it is preferred that the tubular structure 46 have a planar support flange 46 extending along the length of the tubular structure 45, in order to provide support and apply pressure to the bottom portion of the seal when installed within the groove as illustrated in FIG. 11B. Since the side walls 47 of the tubular structure are relatively thin, and collapsible when the pressurized air or other fluid is evacuated from the inside chamber 49 of the tubular structure 45, the support flange tends to collapse towards the base flange 47. The base flange 47 and support flange 48 may be typically formed from the same flexible material as is side walls 46, but are relatively thick in comparison, to provide the desired support to the seal.

While the tubular structural element 45 can be manufactured using known plastic extrusion technology, inflatable pneumatic gaskets are available from Spray Corporation, Pawling, N.Y., sold under the Trademark PNEUMA-SEAL, and can be employed in the present invention. Thus, when the male mold portion is closed down upon the female mold portion and pressurized air is introduced into chamber 49 of the tubular structure 45, the seal 23 is elevated in height so as to snuggly fit against adjacent portions of the bottom edges of the flange edges 2 of the bathtub shell 1, forming a complete seal free from cross-seal leakage. Due to the expandable nature of the seal height adjustment means 45, the tubular structure element 45 automatically establishes a preselected height adjustment contour along the bottom portion of the seal, thereby causing the top portion of the seal to adapt to a surface geometry of the "distortion contour" of the upper flange edges 2 of the bathtub shell.

In an alternative preferred embodiment, the height adjustment means 19 may comprise a shim as illustrated in FIGS. 8A and 8B. The shim may extend along the bottom of the seal groove 9 and the upper surface 50 of the shim may be shaped to the desired contour. The shim may be composed from a variety of materials, including woods, metals, plastics and polymers. The shim is preferably solid and shaped using known sanding techniques.

Thus, while there have been described what are the presently contemplated preferred embodiments of the present invention, various changes and modifications may be made by those of ordinary skill in the art without departing from the scope of the invention, and it is contemplated to claim all such changes and modifications.

What is claimed is:

1. An adjustable sealing assembly in a molding apparatus for applying a coating to a surface of a shell, the molding apparatus including a molding surface and a seal groove having a bottom wall and opposing side walls adapted for retaining a seal, the molding apparatus is capable of receiving the shell and forming a molding cavity between a surface of the shell and the molding surface, the seal establishes sealed contact between the shell and the molding surface when the molding apparatus is closed, the adjustable sealing system comprising:

a seal in a seal groove, and having a bottom, dimensions and elastomeric properties which facilitate insertion and retention in a seal groove of the molding apparatus such that a portion of said seal extends from the seal groove to a selected height when the molding apparatus is opened;

a pair of oppositely disposed side flanges protruding from said seal for retaining said seal within the respective opposing side walls; and solid seal height adjustment means disposed under the seal, said height adjustment means having a width that is at least equal to the width of the portion of said seal that extends from said seal groove and which is capable of adjusting the height of the seal above the seal groove to correspond to particular contour of a shell being molded, whereby the shell establishes sealed contact with the seal forming a sealed molding cavity between the shell and the receptacle molding surface, said height adjustment means comprising at least one structural element having a width dimension that is at least equal to said seal groove width and a length dimension extending under said seal, and means having variable heights, said means extending along said length dimension for adjusting the height of the seal above the seal groove bottom to match the particular contour of the shell being molded.

2. The adjustable sealing assembly of claim 1, wherein said structural element includes a length of solid material which is selectively shaped to match the particular contour of the shell being molded.

3. The adjustable sealing assembly of claim 2, wherein said solid material is selected from the group consisting of wood, polymeric material and metal.

4. The adjustable sealing assembly of claim 1, wherein said seal groove has an opening, a surface opposing said opening, opposing side walls, and wherein said structural element comprises:

a first planar member disposed on said surface opposing said opening, said first planar member being at least as wide as said opening;

a second planar member vertically disposed from said first member for contacting said seal and maintaining the height of said seal above said seal groove, said second planar member being at least as wide as said groove opening; and a separation element vertically disposed between said first and second planar members capable of providing variable spacing between said first and second planar members.

5. The adjustable sealing assembly of claim 4, wherein said separation element comprises a threaded screw which threadably cooperates with a threaded aperture in said first and second planar members.

6. The adjustable sealing assembly of claim 4, wherein said separator element comprises an object having a selected height dimension for placement between said first and said second planar members.

7. The adjustable sealing assembly of claim 6, wherein such object includes a ball bearing.

8. The adjustable sealing assembly of claim 7, wherein at least one of said planar members includes an indentation for receiving a portion of said ball bearing.

9. The adjustable sealing assembly of claim 7, wherein said structural element comprises a tube having an expandable cross-sectional dimension adapted for receiving fluid under pressure to support said seal.

10. A molding apparatus for applying a coating to a surface of a shell and having an adjustable sealing assembly, the molding apparatus including a molding surface and a seal groove adapted for retaining a seal, the molding apparatus is capable of receiving the shell and forming a molding cavity between a surface of the shell and the molding surface, the seal establishes sealed contact between the shell and the molding surface when the molding apparatus is closed, said adjustable sealing assembly comprising:

a seal for insertion and retention in a seal groove, having suitable dimensions and elastomeric properties which facilitate insertion and retention in a seal groove of the molding apparatus such that a portion of said seal extends from the seal groove to a selected height when the molding apparatus is opened; and seal height adjustment means disposed under the seal in the seal groove which is capable of adjusting the height of the seal above the seal groove to correspond to a particular contour of a shell being molded, whereby the shell establishes sealed contact with the seal forming a sealed molding cavity between the shell and the receptable molding surface, said seal height adjustment means having one or more structural elements having a width dimension sufficient to fit within said seal groove and a length dimension extending under said seal, and a variably selectable height dimension extending along said length dimension for adjusting the height of the seal above the seal groove to match the particular contour of the shell being molded, said structural element further having:

a first planar member disposed on said surface opposing said opening;

a second planar member vertically disposed from said first member for contacting said seal and maintaining the height of said seal above said seal groove; and a separation element vertically disposed between said first and second planar members capable of providing variable spacing between said first and second planar members, said separation element being an object having a selected height dimension for placement between said first and said second planar members, wherein such object includes a ball bearing.

11. A molding apparatus of claim 10, wherein said structural element includes a length of solid material which is selectively shaped to match the particular contour of the shell being molded.

12. A molding apparatus of claim 10, wherein said solid material is selected from the group consisting of wood, polymeric material and metal.

13. A molding apparatus of claim 10, wherein said separation element comprises a threaded screw which threadably cooperates with a threaded aperture in said first and second planar members.

14. A molding apparatus of claim 10, wherein at least one of said planar members includes an indentation for receiving a portion of said ball bearing.

15. An adjustable sealing assembly in a molding apparatus for applying a coating to a surface of a shell, the molding apparatus including a molding surface and a seal groove having a bottom wall and opposing side walls adapted for retaining a seal, the molding apparatus is capable of receiving the shell and forming a molding cavity between a surface of the shell and the molding surface, the seal establishes sealed contact between the shell and the molding surface when the molding apparatus is closed, the adjustable sealing assembly comprising:

a seal in a seal groove, and having a bottom, dimensions and elastomeric properties which facilitate insertion and retention in a seal groove of the molding apparatus such that a portion of said seal extends from the seal groove to a selected height when the molding apparatus is opened;

a pair of oppositely disposed side flanges protruding from said seal for retaining said seal within the respective opposing side walls; and seal height adjustment means disposed under the seal, said height adjustment means having a width that is at least equal to the width of the portion of said seal that extends from said seal groove and which is capable of adjusting the height of the seal above the seal groove to correspond to a particular contour of a shell being molded, whereby the shell establishes sealed contact with the seal forming a sealed molding cavity between the shell and the receptacle molding surface, said height adjustment means comprising at least one structural element having a width dimension that is at least equal to said seal groove width and a length dimension extending under said seal, and means having variable heights extending along said length dimension for adjusting the height of the seal above the seal groove bottom to match the particular contour of the shell being molded.

* * * * *